(12) United States Patent
Wendte et al.

(10) Patent No.: US 9,867,329 B2
(45) Date of Patent: Jan. 16, 2018

(54) SYSTEM AND METHOD FOR METERING AND DISTRIBUTING AGRICULTURAL PRODUCTS

(71) Applicant: CNH Industrial America LLC, New Holland, PA (US)

(72) Inventors: Keith W. Wendte, Willowbrook, IL (US); John H. Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 383 days.

(21) Appl. No.: 14/325,127

(22) Filed: Jul. 7, 2014

(65) Prior Publication Data

US 2016/0000003 A1    Jan. 7, 2016

(51) Int. Cl.
*A01C 15/00* (2006.01)
*A01C 15/04* (2006.01)
(Continued)

(52) U.S. Cl.
CPC ............ *A01C 15/04* (2013.01); *A01C 15/005* (2013.01); *A01C 15/14* (2013.01); *A01C 21/00* (2013.01);
(Continued)

(58) Field of Classification Search
CPC .. A01M 7/0092; A01M 7/006; A01M 7/0082; A01M 7/008; A01C 15/005;
(Continued)

(56) References Cited

U.S. PATENT DOCUMENTS 3,622,077 A    11/1971  Wiegand
3,653,951 A     4/1972  Maldeis et al.
(Continued)

FOREIGN PATENT DOCUMENTS

GB    1272461 A    4/1972
GB    2042866 A   10/1980

OTHER PUBLICATIONS

Inoculant—Applicator guide for on-farm applications; Novozymes, 2009, 8 pages.
(Continued)

*Primary Examiner* — Arthur O Hall
*Assistant Examiner* — Juan C Barrera
(74) *Attorney, Agent, or Firm* — Rebecca L. Henkel

(57) ABSTRACT

An agricultural implement includes a first storage container mounted on a frame of the agricultural implement and configured to store a solid particulate agricultural product and a second storage container mounted on the frame and configured to store a liquid. The agricultural implement also includes at least one arm configured to extend laterally outward from the frame, and each of the at least one arms has at least one first nozzle for distributing the solid particulate agricultural product and at least one second nozzle for distributing the liquid. An air metering system includes an auger assembly configured to meter the solid particulate agricultural product from the first storage container into a pneumatic distribution hose, and an air flow in the pneumatic distribution hose is configured to transfer the solid particulate agricultural product toward the at least one first nozzle as the agricultural implement travels across a field.

20 Claims, 6 Drawing Sheets

(51) Int. Cl.

| | | |
|---|---|---|
| *A01C 23/04* | (2006.01) | |
| *A01M 7/00* | (2006.01) | |
| *A01M 11/00* | (2006.01) | |
| *A01C 15/14* | (2006.01) | |
| *A01C 21/00* | (2006.01) | |
| *A01C 23/00* | (2006.01) | |

(52) U.S. Cl.
CPC .......... *A01C 23/007* (2013.01); *A01C 23/047* (2013.01); *A01M 7/006* (2013.01); *A01M 7/0082* (2013.01); *A01M 7/0089* (2013.01); *A01M 11/00* (2013.01)

(58) Field of Classification Search
CPC ... A01C 15/002; A01C 15/003–15/008; A01C 23/00–23/047; A01C 15/00–15/18; A01C 21/00–21/007
USPC ......... 239/159–170, 176, 662, 543; 111/130, 111/131, 132, 133, 11, 12, 13
See application file for complete search history.

(56) References Cited

U.S. PATENT DOCUMENTS

| | | | |
|---|---|---|---|
| 3,926,371 A | 12/1975 | Harrell et al. | |
| 3,939,881 A | 2/1976 | Scott | |
| 3,968,771 A | 7/1976 | Walgenbach et al. | |
| 4,439,211 A | 3/1984 | Anderson | |
| 4,886,208 A | 12/1989 | Strand | |
| 4,921,674 A | 5/1990 | Enos | |
| 4,955,538 A | 9/1990 | Laube et al. | |
| 4,964,575 A | 10/1990 | Takata | |
| 5,904,296 A * | 5/1999 | Doherty | A01C 17/00 239/61 |
| 5,993,903 A | 11/1999 | Toepfer et al. | |
| 6,122,581 A | 9/2000 | McQuinn | |
| 6,361,604 B2 | 3/2002 | Pendleton et al. | |
| 6,375,089 B1 * | 4/2002 | Taylor | A01M 7/0042 239/1 |
| 6,659,374 B1 * | 12/2003 | Chiera | B05B 13/0431 239/164 |
| 6,702,200 B2 * | 3/2004 | Solie | A01C 23/047 239/159 |
| 6,712,496 B2 | 3/2004 | Kressin et al. | |
| 7,370,818 B2 * | 5/2008 | Ward | E01H 10/007 239/146 |
| 8,245,790 B2 * | 8/2012 | Lozier | A62C 31/28 169/24 |
| 8,257,477 B1 | 9/2012 | Hart | |
| 8,371,238 B2 * | 2/2013 | Dean | A01C 7/081 111/179 |
| 2010/0084485 A1 * | 4/2010 | Birthisel | A01C 7/004 239/10 |

OTHER PUBLICATIONS

Equipment Forum: AgSynergy Introduces Anhydrous Applicators, Southeast Farm Press, 2012, 2 pages.

* cited by examiner

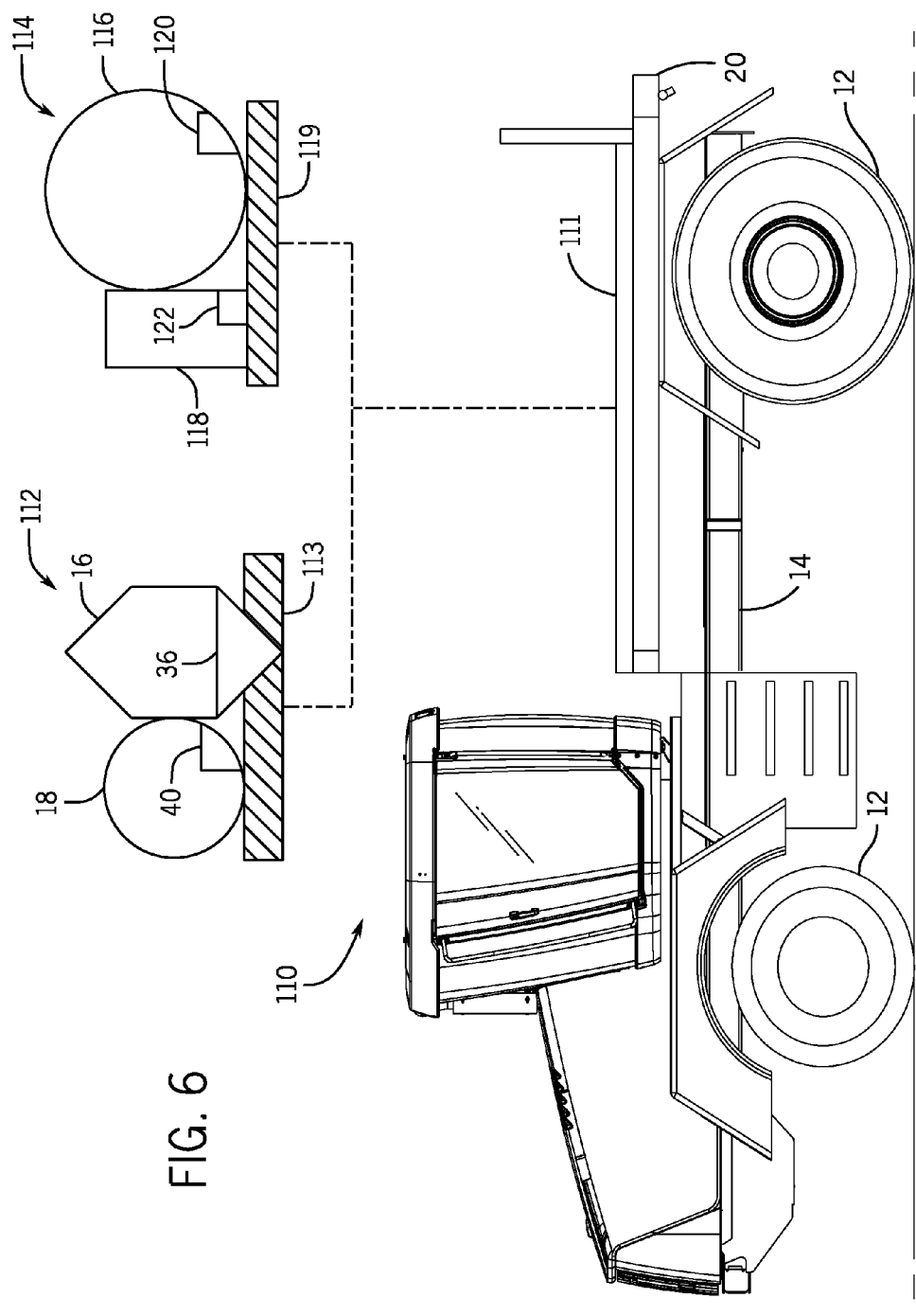

SYSTEM AND METHOD FOR METERING AND DISTRIBUTING AGRICULTURAL PRODUCTS

BACKGROUND

The present application relates generally to agricultural implements, and more specifically, to systems and methods configured to meter and distribute agricultural products.

BRIEF DESCRIPTION

Generally, certain agricultural implements, such as applicators, are designed to apply agricultural products as the applicator travels across a field. For example, some applicators store solid or liquid fertilizer, herbicides, insecticides, or fungicides in a container and deliver the stored material from the container to soil or crops as the applicator travels across the field.

Typical applicators include large containers and large-scale metering systems for densely distributing the agricultural products to soil or crops. Unfortunately, typical applicators may not be suitable for accurately metering materials at a low rate or distributing materials at a low density across the field. Additionally, typical applicators may not have components suitable for distributing certain types of materials or combinations of materials, such as both liquids and solids during a single pass across a field. Furthermore, when liquids or solids are distributed using typical applicators the liquids or solids may drift, resulting in suboptimal application to the targeted area of soil or crops. Accordingly, typical applicators may only be suitable for delivering limited types of agricultural products and/or may not effectively apply the liquids or solids to the soil or crop, thereby resulting in wasted product and/or improper application of the material across the field.

SUMMARY OF THE INVENTION

In one embodiment, an agricultural implement includes a first storage container mounted on a frame of the agricultural implement and configured to store a solid particulate agricultural product and a second storage container mounted on the frame and configured to store a liquid. The agricultural implement also includes at least one arm configured to extend laterally outward from the frame, and each of the at least one arms has at least one first nozzle for distributing the solid particulate agricultural product and at least one second nozzle for distributing the liquid. An air metering system includes an auger assembly configured to meter the solid particulate agricultural product from the first storage container into a pneumatic distribution hose, and an air flow in the pneumatic distribution hose is configured to transfer the solid particulate agricultural product toward the at least one first nozzle as the agricultural implement travels across a field.

In one embodiment, an agricultural implement includes an air metering system configured to meter a solid particulate agricultural product from a solids storage container to at least one solids nozzle and a pump configured to control a flow rate of a liquid from a liquids storage container to at least one liquids nozzle. The at least one solids nozzle and the at least one liquids nozzle are disposed on a laterally-extending arm of the agricultural implement. The at least one solids nozzle, the at least one liquids nozzle, or a combination thereof is configured to enable the liquid to intersect a flow path of the solid particulate agricultural product between the at least one solids nozzle and a region above soil or crops in a field.

In one embodiment, a method for applying a solid particulate agricultural product to a field using an agricultural implement includes transferring the solid particulate agricultural product at a first flow rate from a solids container mounted on a frame of the agricultural implement to at least one solids nozzle coupled to an arm configured to extend laterally outward from the frame of the agricultural implement. The method also includes transferring a liquid at a second flow rate greater than the first flow rate from a liquids container mounted on the frame of the agricultural implement to at least one liquids nozzle coupled to the arm of the frame and positioned adjacent to the at least one solids nozzle. The method further includes adjusting, using a controller, the first flow rate, the second flow rate, a position of the at least one solids nozzle, a position of the at least one liquids nozzle, or a combination thereof, to facilitate contact between the solid particulate agricultural product and the liquid between the at least one solids nozzle and a region above a surface of the field.

DRAWINGS

These and other features, aspects, and advantages of the present invention will become better understood when the following detailed description is read with reference to the accompanying drawings in which like characters represent like parts throughout the drawings, wherein:

FIG. 6 is a side view of an embodiment of a modular applicator configured to utilize various combinations of storage containers and metering systems to meter and distribute solid particulate agricultural products and/or liquids.

DETAILED DESCRIPTION

Figure 1:
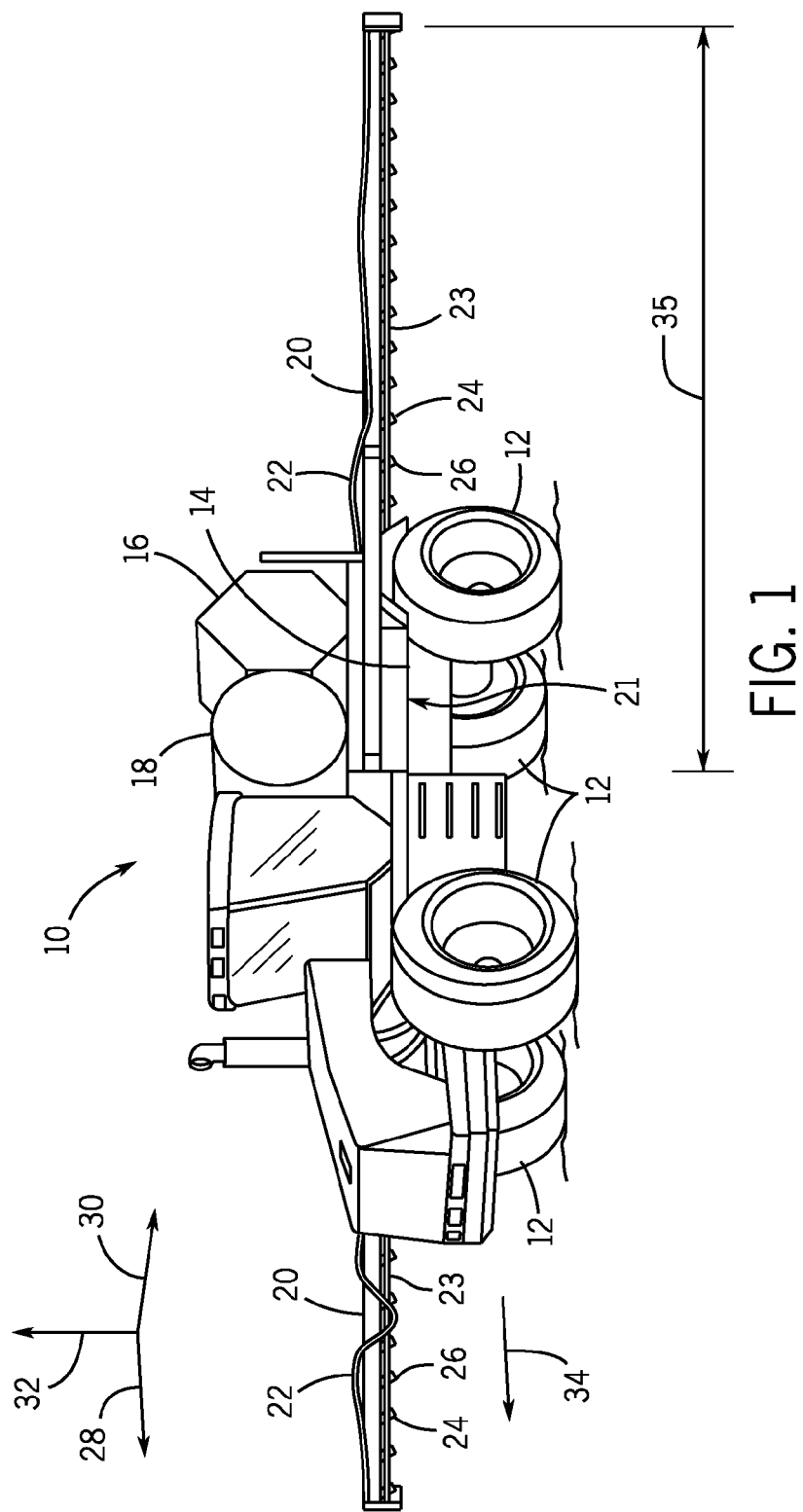
FIG. 1 is a front perspective view of an embodiment of an applicator configured to meter and distribute solid particulate agricultural products and liquids.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to systems and methods for metering and distributing agricultural products. In particular, various components of an agricultural implement (e.g., applicator) enable metering and distribution of solids (e.g., solid particulate agricultural products) and liquids (e.g., one or more liquids). The agricultural implement may be an agricultural applicator implement having multiple storage containers for separately storing solids and liquids. The agricultural applicator implement may include an air metering system configured to meter the solids and a pump configured to control a flow of the liquids. The agricultural applicator implement may distribute the metered solids and liquids through respective nozzles (e.g., outlets) positioned on arms extending laterally outwardly from the agricultural applicator implement, and the nozzles may be arranged such that the solids and the liquids intersect one another between the nozzles and a region above soil or crops in the field. The disclosed embodiments may coordinate the delivery of both solids and liquids to effectively and reliably deliver certain types of agricultural products (e.g., advanced granules or other liquid-activated solids). Such embodiments may also substantially reduce spray drift or dust formation that occurs during the independent distribution of liquids and solids by typical applicators. In certain cases, such embodiments may result in improved adherence of the solids and/or the liquids to the soil or crops in the field. Additionally, the disclosed embodiments may be configured to accurately and reliably meter the solids and/or the liquids at a low rate (e.g., quantity or weight per unit time), such that the solids and/or the liquids are accurately and reliably distributed to the field at a low density (e.g., quantity or weight per unit area) as the applicator travels across a field, for example. Such low-density distribution may be particularly desirable for certain types of agricultural products, such as the advanced granules, other liquid-activated solids, or other concentrated agricultural products, for example.

With the foregoing in mind, FIG. 1 is a side view of an embodiment of an agricultural applicator implement 10 (e.g., applicator) configured to meter and distribute solids and liquids as the applicator 10 travels through a field. The illustrated applicator 10 is self-propelled and includes wheels 12 (e.g., floatation wheels) configured to travel over the field while distributing the weight of the applicator 10 over a large area. The applicator 10 includes a chassis assembly 14 (e.g., frame) configured to support one or more solids storage containers 16 (e.g., storage volumes, bins, or tanks). In some embodiments, the solids storage containers 16 may be divided into multiple compartments. The solids storage containers 16 are configured to hold (e.g., support or store) various solid particulate agricultural products, such as fertilizers, herbicides, pesticides, nutrients, or other biologically-active agents, for example. In some cases, the solids storage containers 16 may store advanced granules or liquid-activated solids. As shown, the chassis assembly 14 is configured to support one or more liquids storage containers 18 (e.g., storage volumes, bins, or tanks). The liquids storage containers 18 may be configured to hold (e.g., support or store) various liquids (e.g., one or more liquids), such as water, aqueous-based liquids, or any other suitable liquid agricultural products or biologically-active agents, for example. In some embodiments, the liquids storage containers 18 may be divided into multiple compartments.

In the illustrated embodiment, the applicator 10 has two elongated arms 20 (e.g., booms) mounted on the chassis assembly 14. In other embodiments, the applicator 10 may have fewer or more arms 20. As shown, the booms 20 are mounted in a mid-section 21 of the chassis assembly 14. Solids flow paths 22 (e.g., solids conduits) and liquids flow paths 23 (e.g., liquids conduit) extend along each of the booms 20 to respective nozzles that are coupled to each of the booms 20. For example, the solids flow paths 22 may deliver the solids to first nozzles 24 (e.g., solids nozzles or solids outlets) for distributing solids, and the liquids flow paths 23 may deliver liquids to second nozzles 26 (e.g., liquids nozzles or liquids outlets) for distributing liquids. The solids flow paths 22 may include belts (e.g., conveyors) that transport the solids to the solids nozzles 24, or the solids flow paths 22 may be hollow conduits through which a flow of air directs the solids to the solids nozzles 24, as discussed in more detail below. For purposes of discussion, the applicator 10 may be described with reference to an axial axis or direction 28, a lateral axis or direction 30, and a vertical axis or direction 32. Further, the applicator 10 may move in a forward direction 34 across the field. In a working position, the booms 20 extend generally laterally outward (e.g., along the lateral axis 30) from the chassis assembly 14 and may be generally parallel to a surface of the field to facilitate distribution of the solids and the liquids to the soil and crops in the field. In a transport or storage position, the booms 20 may be folded against the chassis assembly 14 such that they extend generally in the axial direction 28. Each of the booms 20 may have any suitable length 35 for distributing the solids and the liquids across a large surface area as the applicator 10 travels across the field. For example, each of the booms 20 may be approximately 10, 15, 20, 25, 30, or more meters (m) or more. In some embodiments, each of the booms may be between approximately 10 m to 30 m, or 15 m to 25 m.

Although the applicator 10 of FIG. 1 is illustrated as a self-propelled applicator 10, it should be understood that the applicator 10 may be a towed applicator implement that is supported by wheels and coupled to a tow vehicle (e.g., a harvester, a tractor, or the like). Additionally, the disclosed embodiments for metering and distributing solids and liquids may be adapted for use with other types of agricultural implements and/or other types of applicators.

Figure 2:
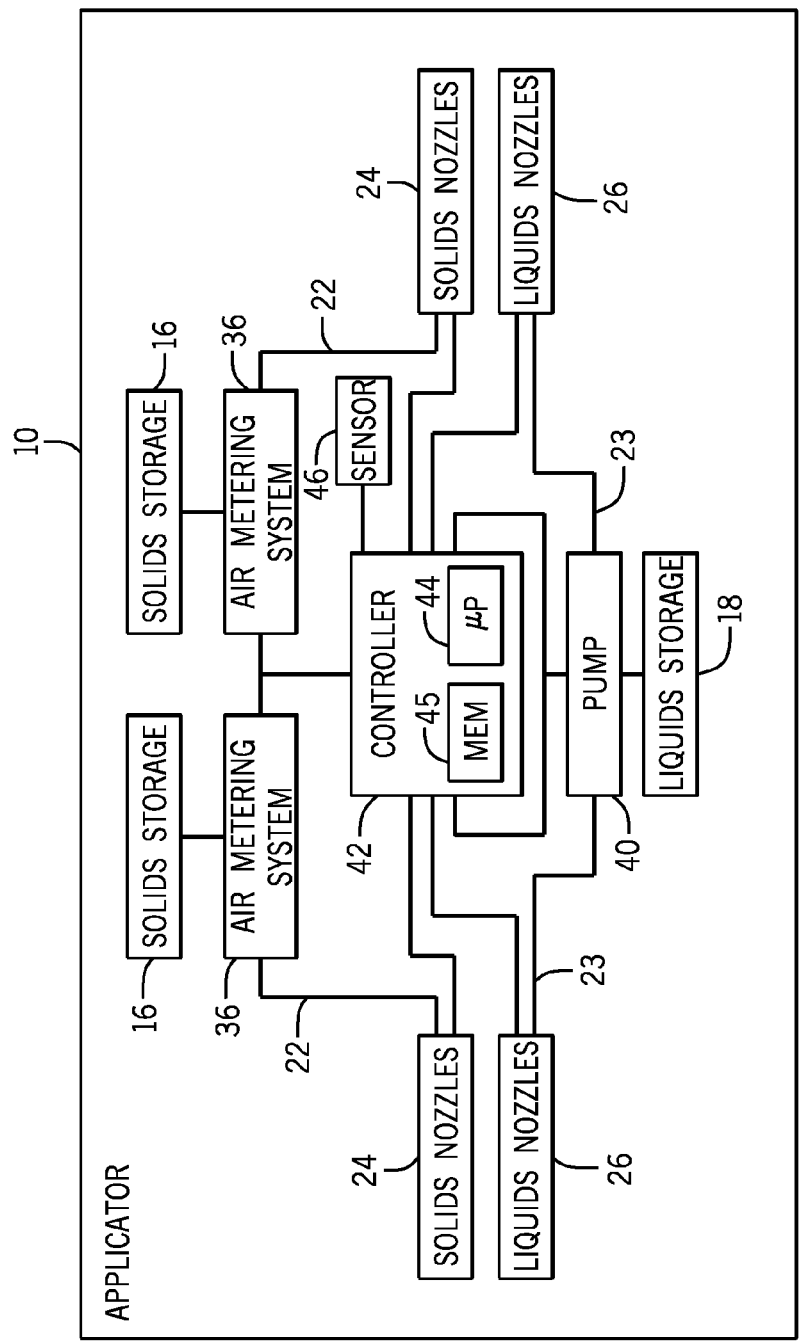
FIG. 2 is a schematic diagram of an embodiment of a portion of an applicator configured to meter and distribute solid particulate agricultural products and liquids.

FIG. 2 is a schematic diagram of an embodiment of a portion of the applicator 10 that is configured to meter and distribute solids and liquids. As shown, two solids storage containers 16 are provided, and each of the solids storage containers 16 is coupled to a respective air metering system 36. Although only two solids storage containers 16 are shown, it should be understood that any suitable number (e.g., 1, 2, 3, 4, 5, 6, 7, 8, 9, 10, or more) of solids storage containers 16 may be provided. Additionally, one or more of the solids storage containers 16 may be divided into multiple compartments. In some such cases, the solids within the multiple compartments may be mixed and metered by one air metering system 36. In other cases, each of the compartments may have a respective air metering system to separately meter the solids contained therein. The metered solids travel from the air metering system 36 toward the solids nozzles 24 along the solids flow paths 22.

As shown in FIG. 2, one liquids storage container 18 is provided. However, any suitable number (e.g., 1, 2, 3, 4, 5, 6, 7, 8, 9, 10, or more) of liquids storage containers 18 may be provided. Additionally, the liquids storage container 18 may include multiple compartments. A pump 40 is provided to establish a flow of the liquids traveling from the liquids storage container 18 along the liquids flow paths 23 to the liquids nozzles 26. In certain embodiments, the pump 40 may facilitate an adjustable flow rate. For example, the pump may be a constant pressure and/or constant volume pump with an adjustable valve.

Additionally, in the illustrated embodiment, a controller 42 is provided to control and coordinate the metering and distribution of the solids and liquids. In certain embodiments, the controller 42 is an electronic controller having electrical circuitry configured to process data from one or more sensors 46 and/or other components of the applicator 10. In the illustrated embodiment, the controller 42 includes a processor, such as the illustrated microprocessor 44, and a memory device 45. The controller 42 may also include one or more storage devices and/or other suitable components. The processor 44 may be used to execute software, such as software for controlling the applicator 10, the air metering system 36, the pump 40, and so forth. Moreover, the processor 44 may include multiple microprocessors, one or more "general-purpose" microprocessors, one or more special-purpose microprocessors, and/or one or more application specific integrated circuits (ASICS), or some combination thereof. For example, the processor 44 may include one or more reduced instruction set (RISC) processors.

The memory device 45 may include a volatile memory, such as random access memory (RAM), and/or a nonvolatile memory, such as ROM. The memory device 45 may store a variety of information and may be used for various purposes. For example, the memory device 45 may store processor-executable instructions (e.g., firmware or software) for the processor 44 to execute, such as instructions for controlling the applicator 10, the air metering system 36, and/or the pump 40. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data.

As shown, the controller 42 may control a flow rate (e.g., a distribution rate) of the solids from the solids storage container 16 to the solids nozzles 24 (e.g., by controlling a rotational rate of a rotating element, such as an auger, within the air metering system 36). As shown, the controller 42 also controls the pump 40, and thus controls a flow rate of the liquids from the liquids storage container 18 to the liquids nozzles 26. The controller 42 may control the metering of the solids and/or the liquids (e.g., the metering rate or the flow rate) based on any of a variety of inputs or factors, including operator inputs or received data related to a forward speed of the applicator 10, a type of solids, a type of liquids, a crop type, a soil type, a wind speed, a wind direction, a temperature, a humidity, or any other suitable data. Additionally, as discussed in more detail below, the controller 42 may instruct one or more actuators to control a position and/or an orientation of the solids nozzles 24 and/or the liquids nozzles 26 to facilitate distribution of the solids and/or liquids based on any of a variety of inputs or factors, including operator inputs or received data related to a forward speed of the applicator 10, a type of solids, a type of liquids, a crop type, a soil type, a wind speed, a wind direction, a temperature, a humidity, or any other suitable data. In the illustrated embodiment, one or more sensors 46 are coupled to the applicator 10 and provide such data to the controller 42. The controller 42 may receive data via operator inputs and/or the sensors 46, or the controller 42 may retrieve such data from a storage device 43. Additionally, the controller 42 may receive and carry out instructions from the memory 45 to control the features set forth above and to facilitate contact between the liquid and the solid particulate agricultural product, as discussed in more detail below.

The applicator 10 is generally configured to enable controlled and coordinated distribution of solids and liquids. Thus, the applicator 10 may be suitable for use with advanced granules or other liquid-activated solids, for example. Additionally, the applicator 10 may be configured to meter the solids at a low rate, such as less than approximately 90 pounds (lbs) per hour, or approximately 40 kilograms (kg) per hour. In some embodiments, the applicator 10 may be configured to meter the solids at approximately 20 to 500 kg per hour, 30 to 300 kg per hour, or 30 to 100 kg per hour. In certain embodiments, the applicator 10 may be configured to meter the solids at less than approximately 500, 300, 100, 90, 80, 70, 60, 50, 40, 30, 20, or fewer kg per hour. Thus, the applicator 10 may distribute the solids to the soil or the crops in the field at a low density. For example, the applicator 10 may distribute the solids to the soil or the crops in the field at a density of less than approximately 5 pounds per acre, or approximately 5.6 kilograms (kg) per hectare (ha), as the applicator 10 travels at approximately 15 to 16 kilometers per hour (kmph). In some embodiments, the applicator 10 may be configured to meter the solids at approximately 1 to 50, 1 to 20, 1 to 10, 2 to 8, 3 to 6, or 4 to 6 kg per ha. In some embodiments, the applicator 10 may be configured to meter the solids at less than approximately 20, 15, 10, 9, 8, 7, 6, 5, 4, 3, 2, 1, or fewer kg per ha.

Additionally, in some embodiments, the applicator 10 may be configured to control the flow of the liquids via the pump 40 such that the liquids are pumped from the liquids container 16 at a flow rate of approximately 320 liters per hour. In some embodiments, the liquids may be pumped from the liquids container 16 at the flow rate of approximately 100 to 500, 200 to 400, or 250 to 350 liters per hour. In certain embodiments, the liquids may be pumped from the liquids container 16 at the flow rate of less than approximately 500, 400, 300, 200, 100, or fewer liters per hour. Thus, the liquids may be distributed to the field at a low density of approximately 5 gallons per acre, or about 47 liters per ha, as the applicator 10 travels at approximately 15 to 16 kmph. In some embodiments, the applicator 10 may be configured to meter the liquids at approximately 20 to 70, 30 to 60, or 45 to 55 liters per ha. In some embodiments, the applicator 10 may be configured to meter the liquids at less than approximately 60, 55, 50, 45, 40, or fewer liters per ha.

Furthermore, in certain applications, a first mass flow rate at which the liquids are distributed is greater than a second mass flow rate at which the solids are distributed across the field, and/or a first volumetric flow rate of the liquids is greater than a second volumetric flow rate of the solids. Such distributions may be desirable for certain types of agricultural products, such as advanced granules or other liquid-active solids, as a larger volume and/or mass of liquids may be utilized with a smaller volume and/or mass of the concentrated advanced granules, for example. Thus, in some configurations, the liquids storage container 18 (e.g., a total volume of the one or more liquids storage containers 18) may be larger than the solids storage container 16 (e.g., a total volume of the one or more solids storage containers 16) to provide a suitable ratio for distribution of the liquids and the solids across the field.

Figure 3:
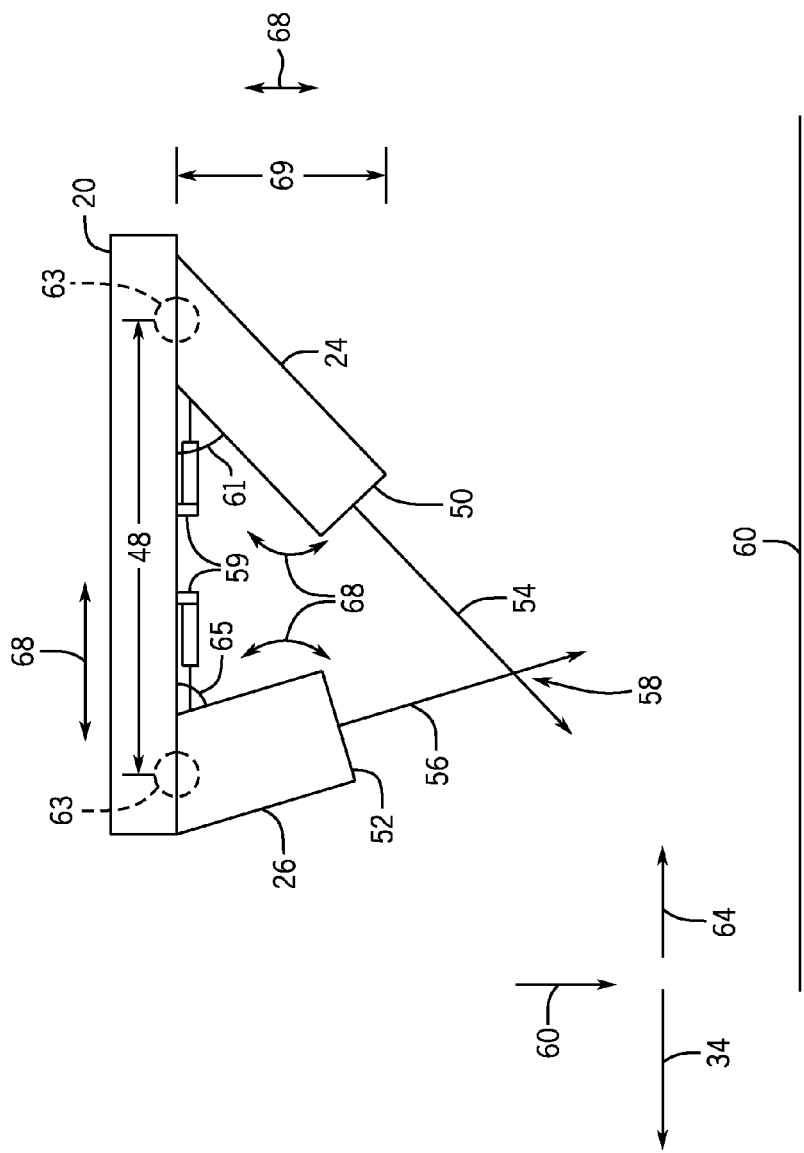
FIG. 3 is a schematic diagram of an embodiment of nozzles that may be employed in the applicator of FIG. 1, in which the nozzles are configured to distribute solid particulate agricultural products and liquids.

With the foregoing in mind, FIG. 3 is a schematic diagram of an embodiment of a solids nozzle 24 and a liquids nozzle 26 of the applicator 10. As shown, the solids nozzle 24 is positioned proximate to the liquids nozzle 26 at a distance 48. The solids nozzle 24 has a first outlet 50 (e.g., solids outlet) and the liquids nozzle 26 has a second outlet 52 (e.g., liquids outlet). The solids outlet 50 and the liquids outlet 52 may each be positioned and/or oriented to enable the solids and the liquids to contact the soil or the crops in the field as the applicator 10 travels in the forward direction 34.

In certain embodiments, the solids outlet 50, the liquids outlet 52, or a combination thereof, is positioned and/or oriented relative to one another to enable the liquids to intersect the solids between the solids outlet 50 and a region above the soil or the crops in the field. For example, the solids nozzle 24 is configured to direct the solids along a first path 54, and the liquid nozzle 26 is configured to direct the liquids along a second path 56 that generally intersects with the first path 54 in an intersection region 58 above a surface of the soil or the crops in the field 60.

In the illustrated embodiment, the solids outlet 50 is generally oriented to distribute the solids in a downward direction 60 and in the forward direction 34. Thus, the solids outlet 50 is oriented at a first angle 61 relative to the boom 20 and/or relative to the surface of the field 60. In some such cases and as shown, the liquids outlet 52 is generally oriented to distribute the liquids in the downward direction 60 and in a rearward direction 64, opposite the forward direction 34. Thus, the liquids outlet 52 is oriented at a second angle 65 relative to the boom 20 and/or relative to the surface of the field 60. Such an arrangement may facilitate contact between the liquids and the solids as the applicator travels across the field and/or may enable improved application to the crops or the soil in the field. The first angle 61 and the second angle 65 may each be any suitable angle, such as less than approximately 95, 90, 85, 80, 75, 70, 60, 65, 55, 50, 45, 40, 35, or fewer degrees.

It should be understood that the position and orientation of the solids outlet 50 and the liquids outlet 52 of FIG. 3 is merely exemplary, and that the solids outlet 50 and the liquids outlet 52 may be disposed and/or oriented in any suitable position and/or angle for facilitating contact between the solids and the liquids. For example, in some embodiments, the solids outlet may face generally in the rearward direction 64 and the liquids outlet 52 may face generally in the forward direction 34. Additionally, in some cases, a position and/or an orientation of the solids outlet 50 and/or the liquids outlet 52 may be adjustable, as shown by arrows 68. For example, the distance 48 between the solids outlet 50 and the liquids outlet 52, a distance 69 of the solids outlet 50 and/or liquids outlet 52 relative to the boom 20, the first angle 61, and/or the second angle 65 may be adjustable by the operator via mechanical adjustment or operator inputs, or may be automatically adjusted via one or more position actuators 59 and/or via one or more orientation actuators 62. For example, a processing component of the applicator 10, such as the controller 42, may instruct the position actuators 59 to adjust the position and/or the orientation actuators 63 to adjust the orientation of the nozzles 24, 26 based on any of a variety of inputs or factors, including received data related to a forward speed of the applicator 10, a type of solids, a type of liquids, a crop type, a soil type, a wind speed, a wind direction, a temperature, a humidity, or any other suitable data. As set forth above, the sensors 46 may be coupled to the applicator 10 and may obtain such data and provide the data to the controller 42. By way of example, in response to high wind speed, the controller 42 may instruct the position actuator 59 and/or the orientation actuator 63 to reduce the distance 48, the first angle 61, and/or the second angle 65 to facilitate contact between the solids and the liquids. Furthermore, the solids nozzle 24 and the liquids nozzle 26 may have any suitable geometry, including a rectilinear cross-section or a round cross-section.

Figure 4:
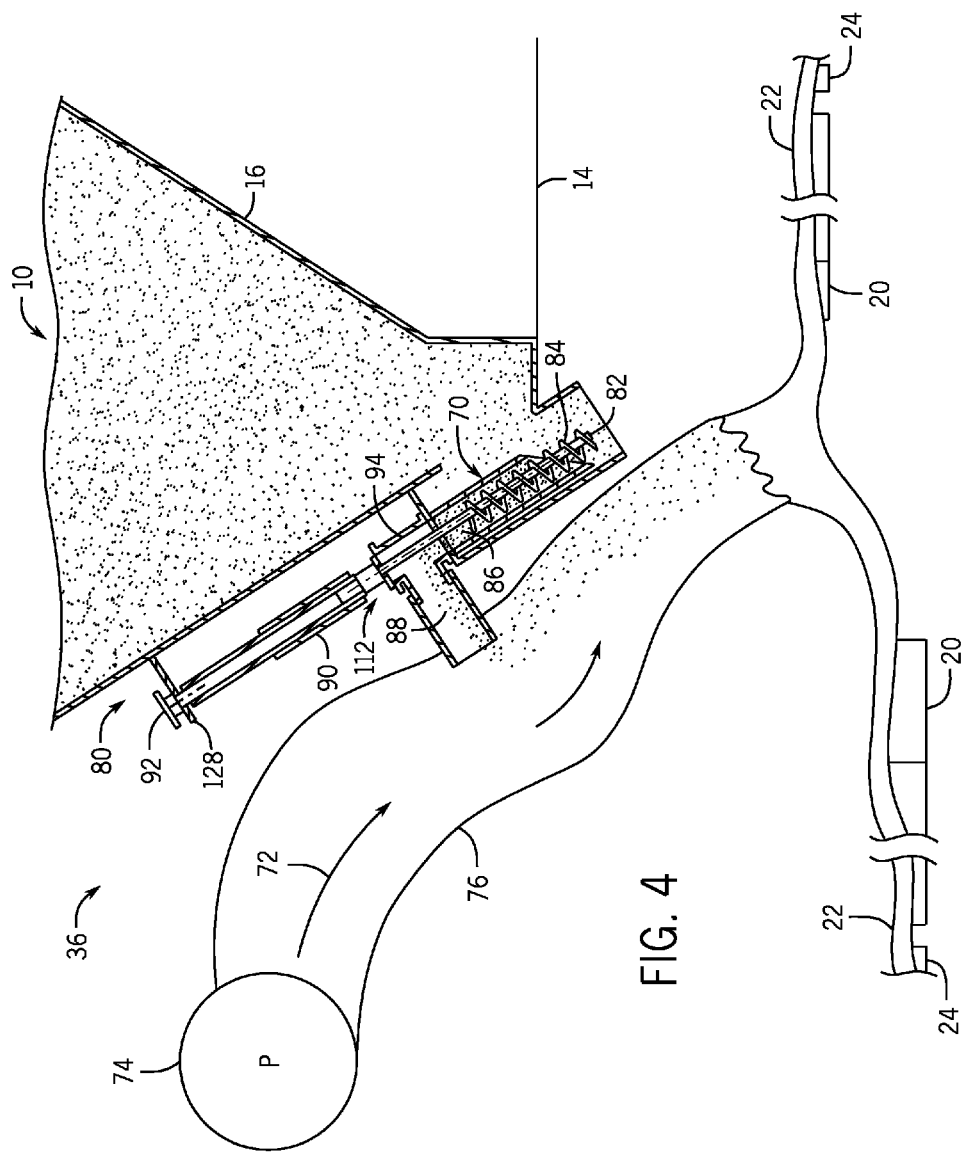
FIG. 4 is a schematic diagram of an embodiment of an air metering system configured to be used with an applicator to meter solid particulate agricultural products.

FIG. 4 is a schematic diagram of an embodiment of an air metering system 36 that may be used with the applicator 10 and that is configured to meter the solids. As shown, the air metering system 36 is mounted on the chassis assembly 14 of the applicator 10. In some cases, the air metering system 36 may be permanently affixed (e.g., welded) to the chassis assembly 14 and may be part of the applicator 10. As shown, the solids are gravity fed toward a rotating element 70 (e.g., auger) that is configured to meter (e.g., control a flow of) the solids from the solids storage container 16 into an air flow 72 provided by an air source 74. The solids may be entrained in the air flow 72 and may be carried through a pneumatic distribution hose 76. As shown, the air flow 72 carries the solids through the hose 76 and through hollow solid flow paths 22 that extend along the booms 20 toward the solids nozzles 24. In other embodiments, the air flow 72 may transfer the solids to the solids flow paths 22, which include belts (e.g., conveyors) that transport the solids along the booms 20 to the solids nozzles 24.

The auger 70 is part of an auger assembly 80 that includes a lower end 82, a helicoid flange 84, a holding chamber 86, an outlet port 88, a drive shaft 90, a drive sprocket 92, and an auger tube 94. In the illustrated configuration, as the drive shaft 90 rotates, the solids within the auger tube 94 flow toward the outlet port 88. The auger tube 94 contains the solids until the solids reach the outlet port 88. As shown, the outlet port 88 connects directly to the hose 76. Thus, as the solids flow out of the outlet port 88, the air flow 72 from the air source 74 mixes with the solids and carries the solids through the hose 76 to the solids flow path 22, where the solids are distributed to the solids nozzles 24.

As set forth above, the air metering system 36 may be configured to meter the solids at a low rate such that the solids are distributed to the soil or the crops in the field at a low density. As set forth above, such a configuration may be particularly useful for distributing concentrated solids, such as advanced granules or liquid-activated solids. Additionally, although one auger 70 is illustrated in FIG. 4, multiple auger assemblies 80 and/or multiple hoses 76 may be provided to independently regulate and distribute flow of the solids from the solids storage container 16 to each of the nozzles 24, thereby providing a substantially uniform distribution of the solids to the soil and the crops in the field. Furthermore, such a configuration may enable distribution of the solids to each nozzle 24 or group of nozzles 24 to be individually controlled (e.g., turned on, shut off, or adjusted) based on operator input and/or operating conditions, based on input from sensors or predetermined maps of the field, for example.

Figure 5:
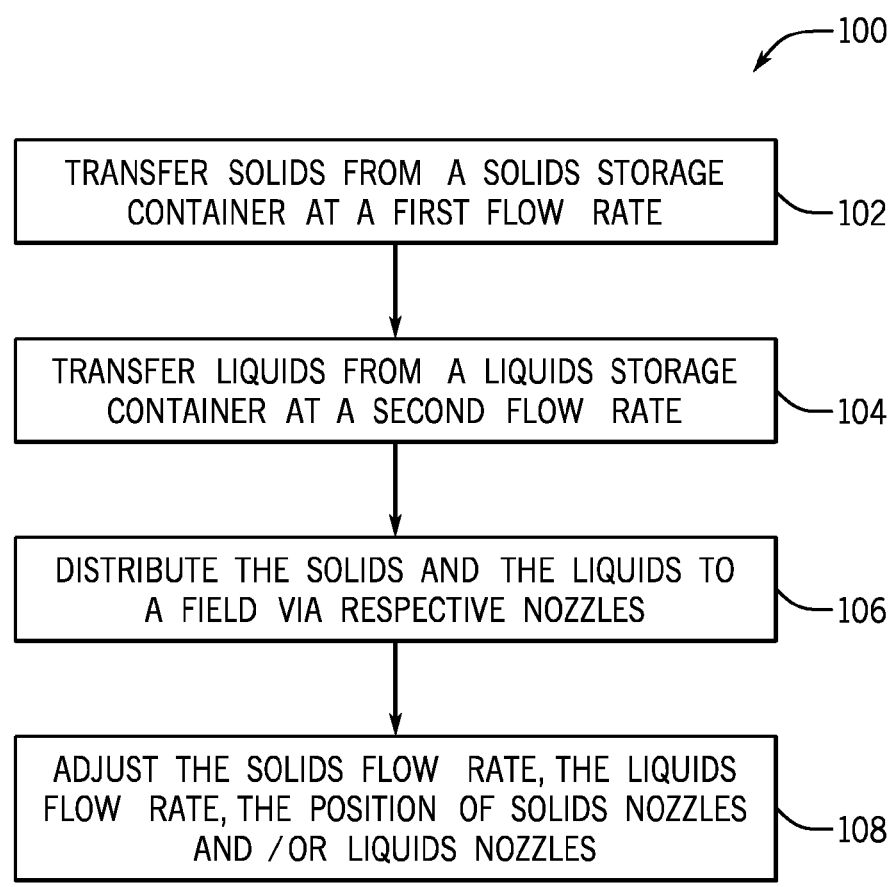
FIG. 5 is a flow diagram of an embodiment of a method 100 for metering and distributing solids and liquids using the applicator 10 of FIGS. 1-4.

FIG. 5 is a flow diagram of an embodiment of a method 100 for metering and distributing solids and liquids using the applicator 10 of FIGS. 1-4. As shown, the method 100 begins with transferring the solids at a solids flow rate from the solids container 16 that is mounted on the chassis assembly 14 of the applicator 10 to the solids nozzles 24 coupled to the booms 20 (block 102). As set forth above, the solids flow rate is controlled via the air metering system 36, which includes the auger assembly 80 and the air source 74 that provides the air flow 72 to carry the solids toward the solids nozzles 24. The solids flow rate may be low to facilitate distribution of the solids at a low density across the field, as set forth above. Additionally, in some embodiments, the solids may be advanced granules or other liquid-activated solids.

The method 100 also includes transferring liquids at a liquids flow rate from the liquids container 18 that is mounted on the chassis assembly 14 of the applicator 10 to the liquids nozzles 26, which are coupled to the booms 20 (block 104). As noted above, the liquids nozzles 26 may be positioned proximate to the solids nozzles 24 to facilitate contact between the solids and the liquids between the solids nozzles 24 and a region above the soil or crops in the field. Additionally, the liquids flow rate may be controlled by the pump 40, and the liquids flow rate may be different from the solids flow rate. The liquids flow rate may be controlled so that the liquids and the solids are distributed at a certain ratio, such as the desired ratio suitable for the type of solids and/or liquids, for example. In addition, the liquids flow rate may be low to facilitate distribution of the liquids at a low density across the field, as discussed above. The solids and the liquids are distributed to the field via the respective nozzles 24, 26 (block 106).

In some embodiments, the solids flow rate, the liquids flow rate, the position and/or the orientation of the solids nozzles 24, and/or the position of the liquids nozzles 26 may be adjusted (block 108). For example, the controller 42 may receive data via operator inputs or the sensors 46, or the controller 42 may retrieve such data from the storage 43. Additionally, the controller 42 may receive instructions from the memory 45 to make the adjustments set forth above to facilitate contact between the liquid and the solid particulate agricultural product. For example, in response to data indicative of high wind speed, the controller 42 may instruct at least one of the one or more position actuators 59 to reduce the distance between the solids nozzles 24 and the liquids nozzles 26.

FIG. 6 is a side view of an embodiment of a modular agricultural implement 110 (e.g., modular applicator) that is configured to support and to utilize various combinations of storage containers and metering systems to meter and distribute solids and/or liquids. In some embodiments, certain components illustrated in FIG. 2 may form metering and/or distribution modules that are configured to be removably mounted on the modular applicator 110. The modular applicator 110 may include certain features of the applicator 10 discussed above, such as the wheels 12, the chassis assembly 14, the booms 20, the solids flow paths 22, the solids nozzles 24, the liquids flow paths 23, the liquids nozzles 26, and the controller 42, for example. However, some or all of the solids containers 16, some or all of the liquids containers 18, some or all of the air metering systems 36, and/or some or all of the pumps 40 may be part of a first modular unit 112 that is configured to be removably mounted onto the modular applicator 110. For example, the first modular unit 112 may include components that enable low-density distribution of solids, in combination with distribution of liquids to enable accurate, reliable distribution of certain types of agricultural products, such as advanced granules or liquid-activated solids. The components of the first modular unit 112 may be directly coupled to the chassis assembly 14 of the applicator and/or to an applicator mounting frame 111 of the applicator 110. In certain embodiment, the first modular unit includes a mounting frame 113 that supports the components of the first modular unit 112. In some cases, the mounting frame 113 is configured to be removably coupled (e.g., via one or more bolts) to the chassis assembly 14 and/or to the applicator mounting frame 111 of the modular applicator 110.

A second modular unit 114 may include solids containers 116, liquids containers 118, metering systems, and/or pumps, different from those in the first modular unit 112, for example. The components of the second modular unit 114 may be directly coupled to the chassis assembly 14 of the applicator and/or to the mounting applicator frame 113. In certain embodiments, the second modular unit 114 may include a mounting frame 119 that supports the components of the second modular unit 114 and that can be removably coupled to (e.g., via one or more bolts) the frame chassis assembly 14 of the modular applicator 110, or to the mounting applicator frame 111. In some cases, the second modular unit 114 may include components that enable high-density distribution of solids and/or distribution of liquids. The second modular unit may have any suitable form. For example, the second modular unit 114 may include only solids containers 116 and associated metering systems 120, or the second modular unit 114 may include only liquids containers 118 and associated pumps 122. In some cases, the solids containers 116 may be larger than the solids containers 16 of the first modular unit 112 to store larger volumes of solids and to facilitate high-density distribution of the solids over a large surface area. In some such embodiments where solids and liquids are distributed together, the liquids containers 118 may be smaller than the liquids containers 18 of the first modular unit 112, as the liquids may be distributed at relatively lower rates as compared to the solids (e.g., to reduce dust during distribution of certain solids).

In other embodiments, the liquids containers 118 may be larger than the liquids containers 18 of the first modular unit 112 to store larger volumes of liquids and to facilitate high-density distribution of liquids over a large surface area. Additionally, the metering systems 120 may utilize different metering techniques and may not include auger assemblies 80 and/or the air source 74. For example, the solids may be gravity fed into a product delivery hopper and transferred by conveyor to the solids nozzles 24 disposed on the booms 20. Thus, the operator may mount the first modular unit 112 on the modular applicator 110 to meter and distribute certain types of agricultural products, such as advanced granules or liquid-activated solids, at a first density (e.g., a low density, as discussed above) and may mount the second modular unit 114 on the modular applicator 110 to meter and distribute other types of agricultural products, such as solid fertilizers and/or liquid fertilizers at a relatively higher rate or a higher density, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
  a first storage container mounted on a frame of the agricultural implement and configured to store a solid particulate agricultural product;
  a second storage container mounted on the frame of the agricultural implement and configured to store a liquid;
  at least one arm configured to extend laterally outward from the frame of the agricultural implement, wherein the at least one arm comprises at least one first nozzle configured to distribute the solid particulate agricultural product and at least one second nozzle configured to distribute the liquid, and a position, an orientation, or a combination thereof, of the at least one second nozzle is adjustable;

an air metering system comprising an auger assembly configured to meter the solid particulate agricultural product from the first storage container into a pneumatic distribution hose, wherein an air flow in the pneumatic distribution hose is configured to transfer the solid particulate agricultural product toward the at least one first nozzle as the agricultural implement travels across a field; and a controller configured to adjust the position, the orientation, or a combination thereof, of the at least one second nozzle based on a flow rate of the solid particulate agricultural product, a position of an outlet of the at least one first nozzle, an orientation of the outlet of the at least one first nozzle, or a combination thereof, to facilitate contact between the liquid and the solid particulate agricultural product.

2. The agricultural implement of claim 1, wherein the at least one first nozzle, the at least one second nozzle, or a combination thereof, is positioned to enable the liquid to intersect a flow path of the solid particulate agricultural product between the at least one first nozzle a region above soil or crops in the field.

3. The agricultural implement of claim 1, wherein the air metering system is configured to meter the solid particulate agricultural product at rates of less than 40 kilograms per hour.

4. The agricultural implement of claim 1, wherein each first nozzle of the at least one first nozzle comprises a first outlet through which the solid particulate agricultural product is configured to be distributed, and the first outlet is directed toward a forward direction of travel of the agricultural implement.

5. The agricultural implement of claim 4, wherein each second nozzle of the at least one second nozzle comprises a second outlet through which the liquid is configured to be distributed, and the second outlet is directed toward a rearward direction of travel of the agricultural implement.

6. The agricultural implement of claim 1, wherein the controller is configured to adjust the position, the orientation, or a combination thereof, of the at least one first nozzle, the at least one second nozzle, or a combination thereof, based on a wind speed, a wind direction, a temperature, a humidity, a ground speed of the agricultural implement, characteristics of the liquid, characteristics of the solid particulate agricultural product, or a combination thereof.

7. The agricultural implement of claim 1, wherein the first storage container and the air metering system are elements of a module that is configured to be removably coupled to the frame.

8. The agricultural implement of claim 1, wherein the solid particulate agricultural product comprises a liquid-activated advanced granule.

9. An agricultural implement, comprising:
an air metering system configured to meter a solid particulate agricultural product from a solids storage container to at least one solids nozzle; and
a pump configured to control a flow rate of a liquid from a liquids storage container to at least one liquids nozzle;
wherein a first solids nozzle of the at least one solids nozzle is disposed at a first location on a laterally-extending arm of the agricultural implement and a first liquids nozzle of the at least one liquids nozzle is disposed at a second location on the laterally-extending arm of the agricultural implement, the first location and the second location of the laterally-extending arm are separated from one another by a distance along an axial axis that extends in a forward travel direction of the agricultural implement, and the first solids nozzle of the at least one solids nozzle, the first liquids nozzle of the at least one liquids nozzle, or a combination thereof is configured to enable the liquid to intersect a flow path of the solid particulate agricultural product between the first solids nozzle of the at least one solids nozzle and a region above soil or crops in a field.

10. The agricultural implement of claim 9, wherein the solids storage container and the liquids storage container are mounted on a frame of the agricultural implement.

11. The agricultural implement of claim 9, wherein the air metering system and the at least one solids nozzle are configured to distribute the solid particulate agricultural product to the field at a rate of less than approximately 6 kilograms per hectare.

12. The agricultural implement of claim 9, wherein the solid particulate agricultural product comprises a liquid-activated advanced granule.

13. The system of claim 9, wherein a first volume of the solids container is less than a second volume of the liquids container.

14. The agricultural implement of claim 9, wherein a vertical axis that extends through a point at which the liquid intersects the flow path of the solid particulate agricultural is located between the first location and the second location along the axial axis.

15. A method for applying a solid particulate agricultural product to a field using an agricultural implement, comprising:

transferring the solid particulate agricultural product at a first flow rate from a solids container mounted on a frame of the agricultural implement to at least one solids nozzle coupled to an arm configured to extend laterally outward from the frame of the agricultural implement;

transferring a liquid at a second flow rate greater than the first flow rate from a liquids container mounted on the frame of the agricultural implement to at least one liquids nozzle coupled to the arm and positioned adjacent to the one or more solids nozzles; and adjusting, using a controller, the first flow rate, the second flow rate, a position of the at least one solids nozzle, a position of the at least one liquids nozzle, or a combination thereof, to facilitate contact between the solid particulate agricultural product and the liquid between the at least one solids nozzle and a region above a surface of the field.

16. The method of claim 15, comprising distributing the solid particulate agricultural product to the surface of the field at a rate of less than approximately 6 kilograms per hectare.

17. The method of claim 15, comprising distributing the liquid to the surface of the field at a rate of greater than approximately 4.5 liters per hectare.

18. The method of claim 15, wherein the solid particulate agricultural product is transferred via an air metering system comprising an auger assembly and an air source.

19. The method of claim 15, wherein the solid particulate agricultural product comprises a liquid-activated advanced granule.

20. The agricultural implement of claim 15, comprising adjusting the position of the at least one solids nozzle or the position of the at least one liquids nozzle to adjust a distance between a solids outlet of the at least one solids nozzle and a liquids outlet of the at least one liquids nozzle, wherein the distance is along an axial axis that extends in a forward direction of travel of the agricultural implement.

* * * * *